(12) United States Patent
Zabler et al.

(10) Patent No.: US 6,218,924 B1
(45) Date of Patent: *Apr. 17, 2001

(54) ARRANGEMENT FOR THE CONTACTLESS TRANSMISSION OF AN AIR-BAG RELEASE SIGNAL

(75) Inventors: Erich Zabler, Stutensee; Anton Dukart, Wörth, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,108
(22) PCT Filed: May 10, 1996
(86) PCT No.: PCT/DE96/00813
 § 371 Date: Feb. 18, 1998
 § 102(e) Date: Feb. 18, 1998
(87) PCT Pub. No.: WO97/06976
 PCT Pub. Date: Feb. 27, 1997

(30) Foreign Application Priority Data

Aug. 19, 1995 (DE) ............................................. 195 30 589

(51) Int. Cl.[7] ............................ H01F 21/06; H01F 21/04
(52) U.S. Cl. .......................... 336/120; 336/117; 336/119
(58) Field of Search .................................. 336/117, 119, 336/120, 135

(56) References Cited

U.S. PATENT DOCUMENTS

| 2,838,737 | * | 6/1958 | Duncan | 336/120 |
| 3,317,873 | * | 5/1967 | Himmelstein et al. | 336/120 |
| 4,038,624 | * | 7/1977 | Namba et al. | 336/120 |
| 4,167,719 | * | 9/1979 | Forge | 336/120 |
| 5,498,911 | * | 3/1996 | Bossler et al. | 307/10.1 |
| 5,945,744 | * | 8/1999 | Dobler et al. | 307/10.1 |

FOREIGN PATENT DOCUMENTS

| 2509773A1 | * | 4/1976 | (DE) | 336/120 |
| 1239290 | * | 7/1971 | (GB) | 336/120 |
| 55-50610 | * | 9/1980 | (JP) | 336/120 |
| 235187 | * | 7/1964 | (SU) | 336/120 |

* cited by examiner

*Primary Examiner*—Anh Mai
(74) *Attorney, Agent, or Firm*—Kenyon & Kenyon

(57) ABSTRACT

The arrangement includes a transformer whose primary winding and secondary winding are in separate pot cores which can rotate in opposite directions about the axis of rotation of the steering wheel. To prevent these transformers from transferring energy to the squib which could deploy the air bag when a short-circuit to lines carrying on-board voltage occurs on its primary side, only one of the two pot cores is designed as a closed ring and the other pot core is made of one or more ring segments.

9 Claims, 2 Drawing Sheets

ARRANGEMENT FOR THE CONTACTLESS TRANSMISSION OF AN AIR-BAG RELEASE SIGNAL

FIELD OF THE INVENTION

The present invention relates to an arrangement for contactless transmission of a deployment signal from a control circuit arranged on a motor vehicle chassis to an air bag installed in a steering wheel. whose primary and secondary windings are in separate pot-type cores which can rotate in opposite directions about the axis of rotation of the steering wheel.

BACKGROUND INFORMATION

German Patent Application No. 24 33 555 describes a conventional transformer arrangement.

An important criterion for the reliable operation of an air bag is that switching operations or short-circuits in a primary circuit of the transformer must not erroneously deploy the air bag. The transformer absorbs a relatively high magnetic energy in sudden startup and shutdown operations; this energy is discharged mainly in a load connected in a secondary circuit. With an air bag, this load is the firing pellet (squib) resistor. If the energy fed into the squib resistor exceeds a predetermined threshold, the air bag is deployed.

Therefore, the object of the present invention is to provide an arrangement of the type defined in the preamble that will avoid unintentional deployment of the air bag when sudden startup or shutdown operations occur in the primary circuit of the transformer or short-circuits occur between the squib and the power supply lines of the vehicle battery.

SUMMARY OF THE INVENTION

According to the present invention, one of two pot cores of the transformer is not designed as a solid ring but is instead made of one or more ring segments. Accordingly, an inductance of the transformer is reduced so that the magnetic energy absorbed, e.g., when there is a short-circuit to power supply lines in the primary circuit, is not sufficient to deploy the air bag. The magnetic energy absorbed by the transformer can be further reduced by limiting the current in the primary circuit by a higher-resistance design of the primary winding. The segmentation of the pot core also permits a reduction in weight, which has especially advantageous effects with respect to the steering wheel.

For contactless transmission of a deployment signal for an air bag arranged in a steering wheel of a motor vehicle, a transformer is provided, composed of two pot cores, one of which providing a primary winding and the other one providing a secondary winding and are arranged so they can rotate in opposite directions about a common axis. The primary pot core is connected to the chassis on which there is also arranged the control circuit generating the deployment signal. The secondary pot core of the transformer is connected to the steering wheel in which the air bag is installed. The common axis of rotation of the two pot cores is the steering wheel axis.

The magnetic energy absorbed by a transformer when a current flows through the primary winding can be described by the following formula:

$$E = \tfrac{1}{2} \cdot L_1 \cdot I_1^2,$$

where $L_1$ is the primary-side inductance of the transformer and $I_1$ is the current flowing in the primary circuit. The transformer should be designed so that when there is an unwanted switching operation or a short-circuit on the primary side, the magnetic energy absorbed by the transformer absorbs cannot become overly large such that this magnetic energy would deploy the air bag.

The magnetic energy absorbed by the transformer can be reduced by reducing the inductance $L_1$ to the extent that this effect cannot occur.

Figure 1:
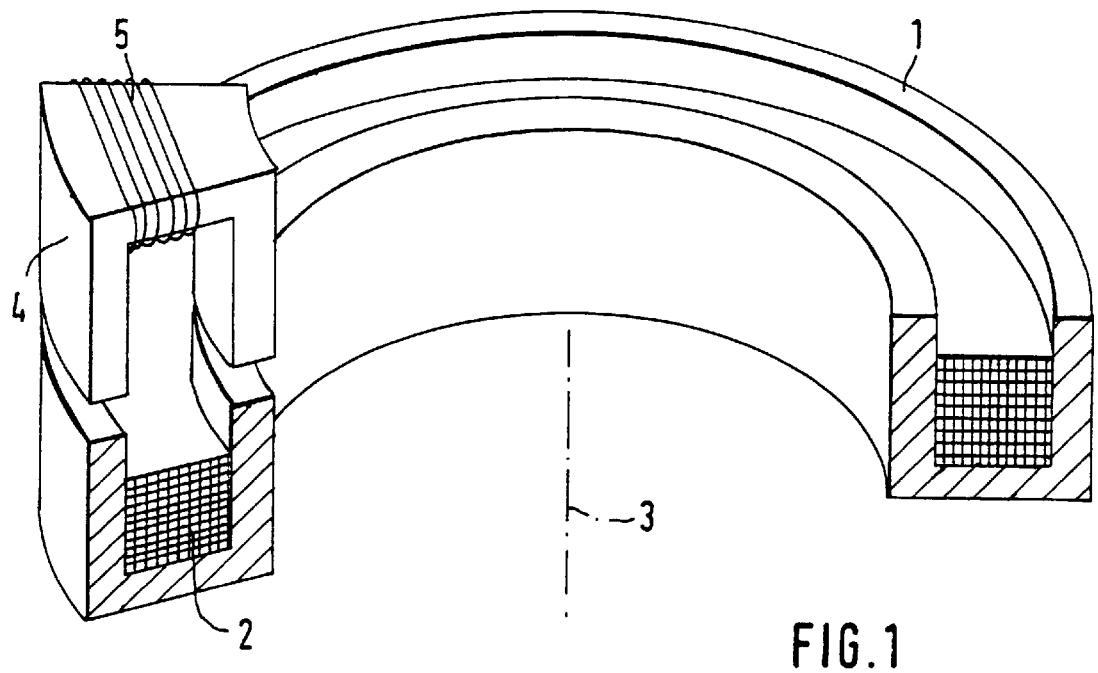
FIG. 1 shows a detailed illustration of an exemplary rotary transformer according to the present invention, with one pot core composed of a ring segment.

FIG. 1 shows a detailed illustration of a transformer with a first annular pot core 1 which has primary winding 2, for example. This primary pot core 1 is connected to a motor vehicle chassis (not shown). A secondary pot core 4, mounted to rotate about steering wheel axis 3 with respect to this primary pot core 1, is made of only a ring segment instead of a closed ring. Replacing a closed pot core ring with a ring segment provides a required reduction in inductance $L_1$ of the transformer. If the magnetic energy of the transformer should be reduced further, it is possible to limit the current in the primary circuit to a lower level. This can be achieved by designing the primary winding with a higher resistance than the secondary winding. As such, a thinner copper wire or a wire material with a higher resistance such as constantan may be used for the primary winding, for example.

As shown in FIG. 1, both pot cores 1 and 4 have a U profile shape. Although primary winding 2 connected to the controller is in the U profile ring, secondary winding 5 connected to a squib of the air bag is wound around a leg of U profile 4, which has the form of a ring segment.

Figure 3:
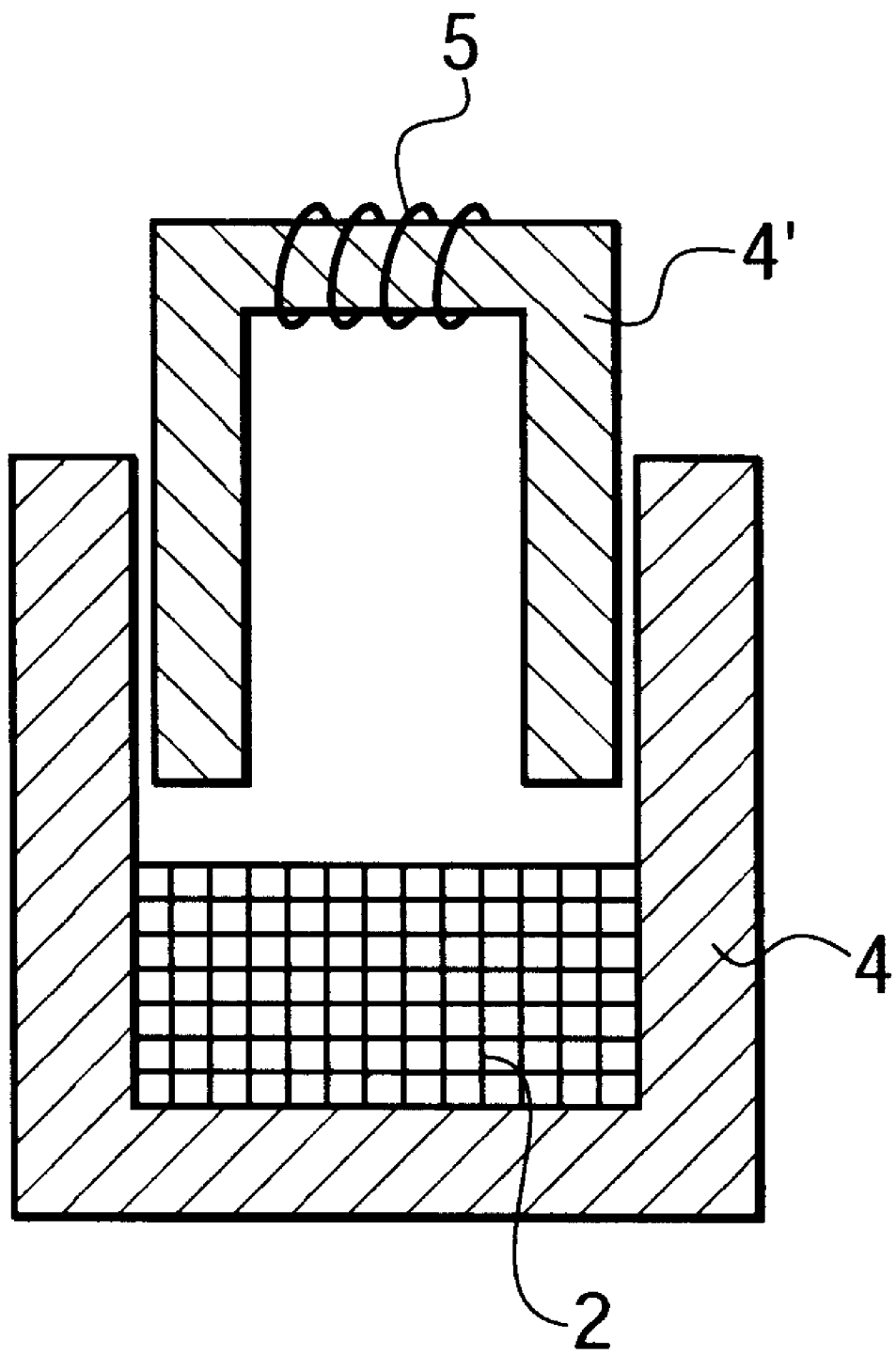
FIG. 3 shows an illustration of an additional embodiment of the present invention with a first pot core coaxially mounted in a second pot core.

The end faces of U profiles 1 and 4 are facing each other, forming two air gaps. It is also possible to arrange the two U profiles 1 and 4 coaxially one inside the other in such a way that the air gaps between them are intersected by the magnetic flux radially to axis of rotation 3 as shown in FIG. 3. If the end faces of one U profile are widened in comparison with the end faces of the other U profile, the coupling between windings 2 and 5 becomes insensitive to axial misalignment between the two pot cores 1 and 4. Thus, assembly tolerances in the steering wheel do not have an interfering effect on signals transmitted from the controller to the air bag.

Figure 2:
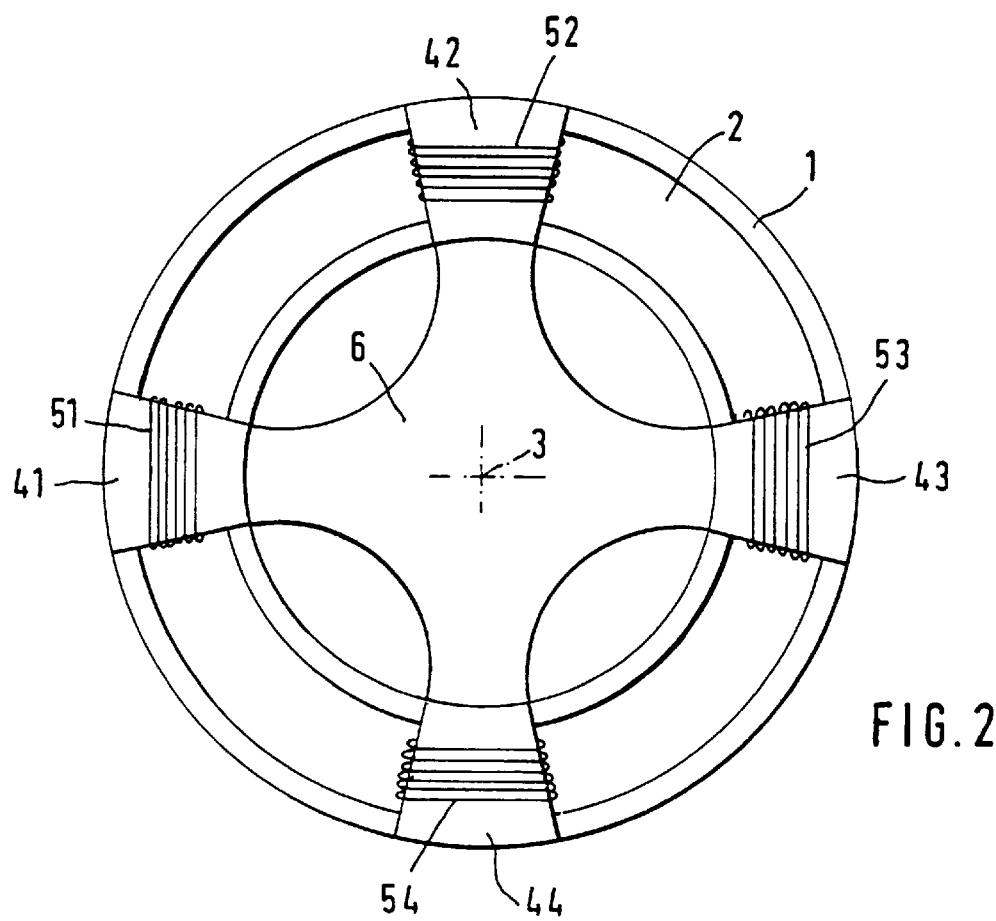
FIG. 2 shows the exemplary rotary transformer, with one pot core composed of four ring segments.

FIG. 2 shows an embodiment of a transformer according to the present invention, where the secondary pot core consists of four ring segments 41, 42, 43 and 44. These four ring segments are mechanically interconnected via a spoke-type carrier 6. Carrier 6 is preferably made of a nonmagnetizable plastic material.

Each of ring segments 41 through 44 is provided with a winding 51, 52, 53 and 54. All the windings can be connected in series and thus form a common secondary winding. As an alternative, any other combinations of individual windings may be wired together so that ultimately there are several secondary windings with which various functions in the steering wheel can be controlled (e.g., air bag, horn, radio, steering wheel heating, etc.).

Faulty deployment of an air bag can also occur when a short-circuit occurs at the secondary terminals of the transformer. The risk of such a short-circuit can be largely prevented by having the secondary side of the transformer and the squib of the air bag designed as close together as possible, so that harmful contact of the lines between the transformer and the squib can be prevented.

The possibility of an air bag being deployed with the steering wheel dismantled can be ruled out. One possible measure to prevent such event is a short-circuit switch in front of the squib to short-circuit the terminals of the squib when the steering wheel is dismantled, so that no external current can flow through the squib. The short-circuit switch can be actuated automatically by a pin on the steering column which engages in an orifice on the steering wheel and opens the short-circuit switch when the steering wheel is mounted on the steering column. As soon as the steering wheel is removed, the pin releases the switch and closes it. If the switch fails to open when the steering wheel is reassembled, this malfunction is automatically detected (as a short-circuit) by squib monitoring.

What is claimed is:

1. A transformer arrangement for a contactless transmission of a deployment signal from a control circuit situated on a motor vehicle chassis to an air bag situated in a steering wheel, the transformer arrangement comprising:

a first pot core having a closed ring form and including only a single winding; and a second pot core, the first pot core and the second pot core being rotatable with respect to each other about a common rotation axis, the second pot core including a plurality of ring segments and a plurality of second windings, each of the plurality of the ring segments including a corresponding one of the plurality of second windings, the plurality of second windings being simultaneously inductively coupled with the single winding, wherein the first pot core and the second pot core are adapted to contactlessly transmit a deployment signal to an airbag, the deployment signal being contactlessly transmitted between the single winding and the plurality of second windings.

2. The transformer arrangement according to claim 1, wherein the plurality of ring segments includes a common carrier element composed of a nonmagnetizable material, and wherein at least two of the plurality of second windings are connected in series.

3. The transformer arrangement according to claim 1, wherein one of the first and second pot cores is coaxially mounted inside another one of the first and second pot cores to form an air gap between the first and second pot cores, the air gap being intersected radially to the rotation axis by a magnetic flux.

4. The transformer arrangement according to claim 1, wherein one of: 1) the single winding and 2) the plurality of second windings forms a primary winding, and another one of: 1) the first winding and 2) the plurality of second windings forms a secondary winding, the primary winding having a first resistance value, and the secondary winding having a second resistance value, the first resistance value being greater than the second resistance value.

5. The transformer arrangement according to claim 1, wherein the plurality of second windings together form one of a primary winding and a secondary winding.

6. The transformer arrangement according to claim 1, further comprising:

a steering wheel, the common axis of rotation being coaxial with an axis of rotation of the steering wheel.

7. The transformer arrangement according to claim 1, wherein an inductance of the transformer arrangement does not change when the first pot core and the second pot core are rotated relative to each other.

8. An arrangement for a contactless transmission of a deployment signal from a control circuit situated on a motor vehicle to an air bag, the arrangement comprising:

a steering wheel, the air bag being situated in the steering wheel;

a first pot core and a second pot core rotatable with respect to each other about a common rotation axis, the common axis of rotation being coaxial with an axis of rotation of the steering wheel;

a first winding arranged in the first pot core; wherein the first pot core has a closed ring form, and the second pot core includes a plurality of ring segments and a plurality of second windings, each of the plurality of ring segments including a corresponding one of the plurality of second windings, the plurality of second windings being simultaneously inductively coupled with the first winding arranged in the first pot core, wherein the first pot core and the second pot core are adapted to contactlessly transmit a deployment signal to an air bag, the deployment signal being contactlessly transmitted between the first winding and the plurality of second windings.

9. The arrangement according to claim 8, wherein an inductance of the arrangement does not change when the first pot core and the second pot core are rotated relative to each other.

* * * * *